United States Patent [19]

Eastman

[11] 4,315,434
[45] Feb. 16, 1982

[54] PULSE WIDTH MODULATION (PWM) WITH JEWEL PIVOT ACCELEROMETER

[75] Inventor: Marcus R. Eastman, Orlando, Fla.

[73] Assignee: The United States of America as represented by the Secretary of the Army, Washington, D.C.

[21] Appl. No.: 152,001

[22] Filed: May 21, 1980

[51] Int. Cl.³ .............................................. G01P 15/13
[52] U.S. Cl. ..................................... 73/517 B; 73/496
[58] Field of Search ................. 73/516 R, 517 B, 496

[56] References Cited

U.S. PATENT DOCUMENTS

| | | | |
|---|---|---|---|
| 3,028,550 | 4/1962 | Naydan et al. | 73/517 B |
| 3,078,725 | 2/1963 | Jimerson et al. | 73/517 B |
| 3,176,521 | 4/1965 | Clark | 73/517 B |
| 3,213,694 | 10/1965 | Clark et al. | 73/517 B |
| 3,911,738 | 10/1975 | Fischer | 73/517 B X |

Primary Examiner—James J. Gill
Attorney, Agent, or Firm—William G. Gapcynski; Arthur I. Spechler; Robert G. Sims

[57] ABSTRACT

The output of the accelerometer is sent to a pulse width modulating digitizing circuitry which consists of a comparator to generate the PWM signal, a flip-flop steering circuit, an "H" switch to toggle the torquer constant current either positive or negative, and an AND gate to gate the clock pulses for the output.

1 Claim, 2 Drawing Figures

PULSE WIDTH MODULATION (PWM) WITH JEWEL PIVOT ACCELEROMETER

DEDICATORY CLAUSE

The invention described herein was made in the course of or under a contract or subcontract thereunder with the Government and may be manufactured, used, and licensed by or for the Government for governmental purposes without the payment to me of any royalties thereon.

SUMMARY OF THE INVENTION

The basic accelerometer and analog circuitry developed for high enviornmental requirements is combined with digital electronic PWM circuitry to provide a digital output for an all digital autopilot. The accelerometer pendulum dither, resulting from the high frequency (10 KHZ) PWM burnishes the jewel pivot bearings and breaks up static friction resulting in unexpected accuracy improvement. The PWM digitizing circuitry consists of a comparator to generate the PWM signal, a flip-flop steering circuit, an "H" switch to toggle the torquer constant current either positive or negative, and an AND gate to gate the clock pulses for the output.

DESCRIPTION OF THE BEST MODE AND PREFERRED EMBODIMENT

This disclosure is based on the unexpected performance obtained when pulse width modulation (PWM) electronics was used with a typical accelerometer with jewel pivot suspension.

Figure 1:
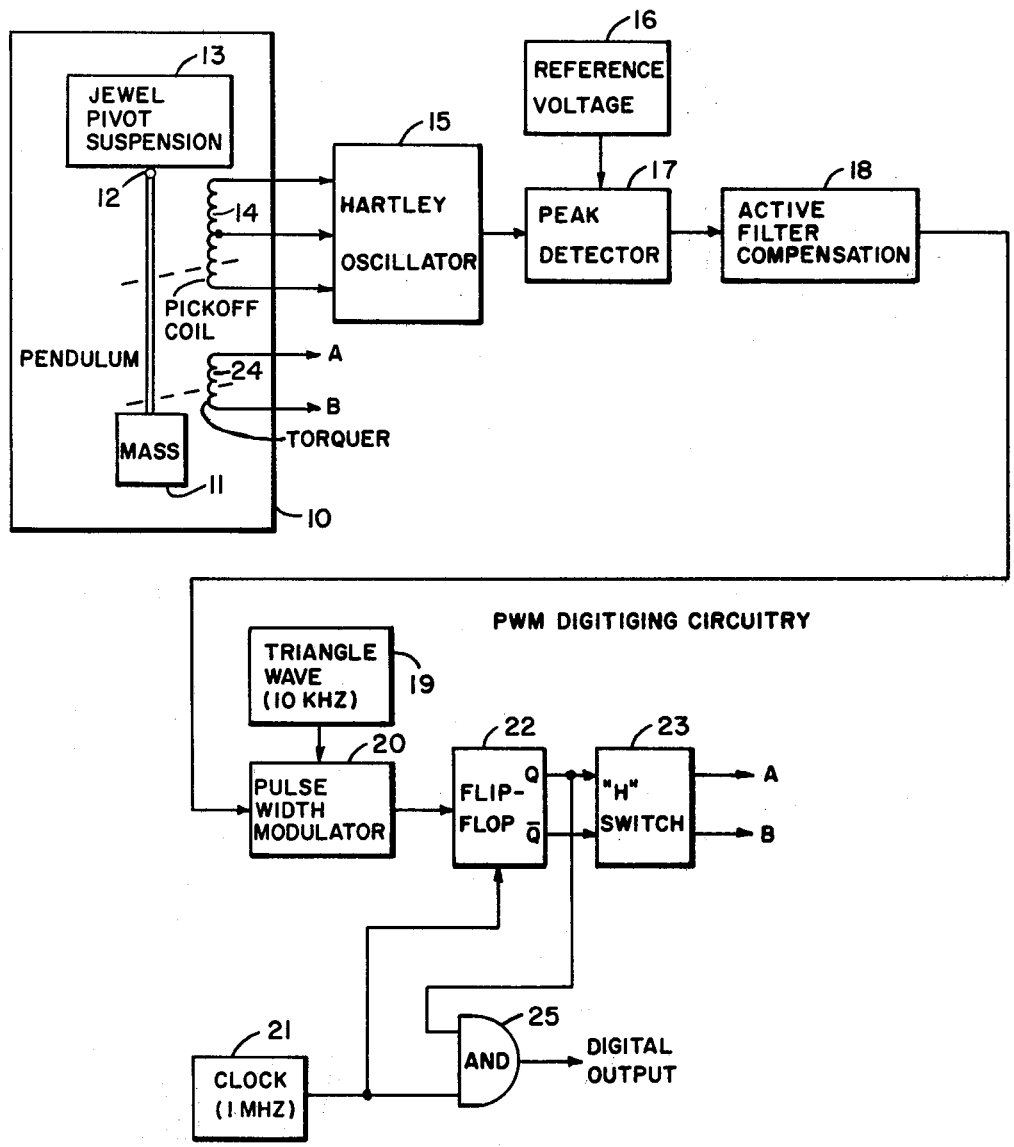
FIG. 1 is a block diagram showing the best mode of the present invention.
Figure 2:
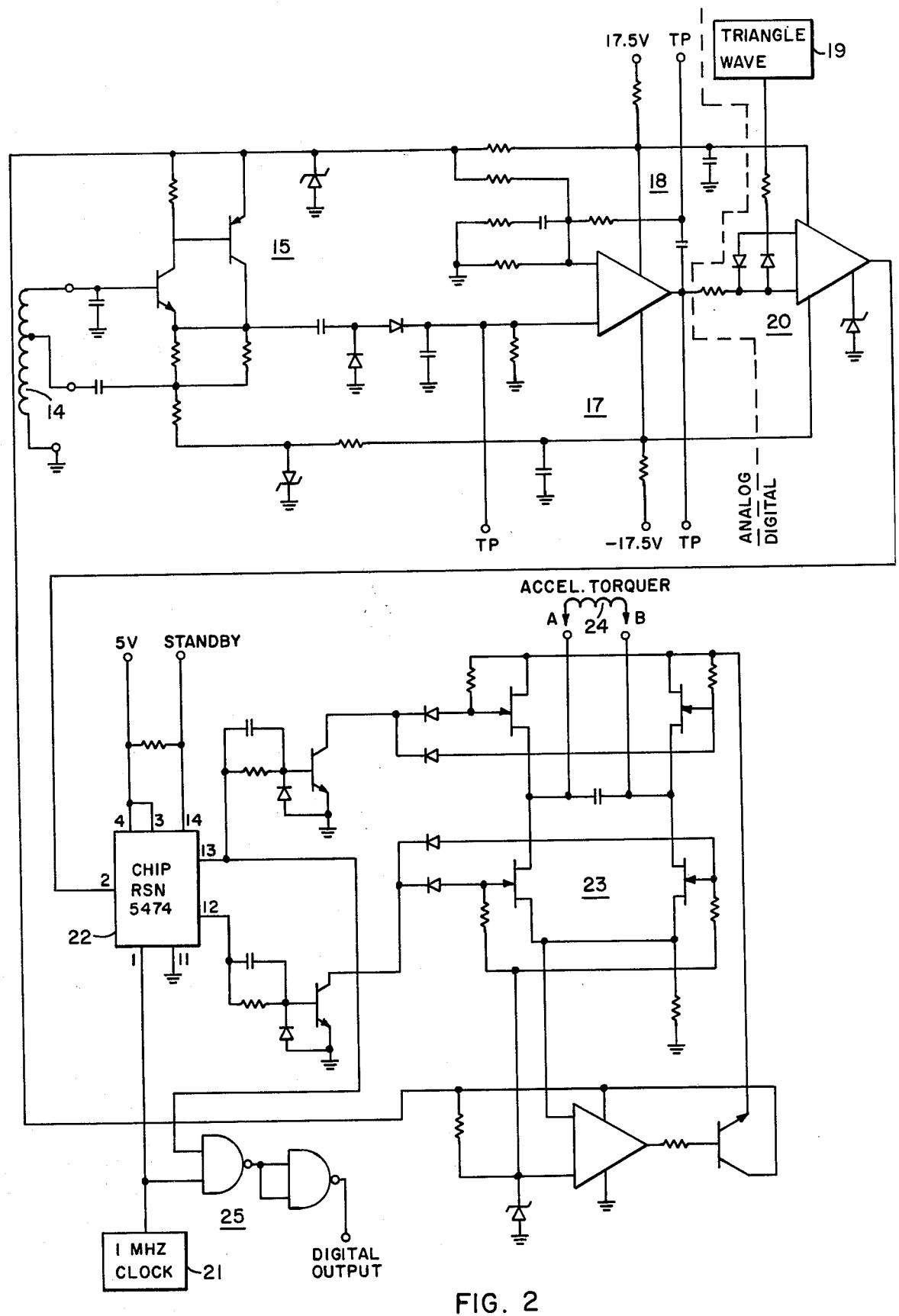
FIG. 2 is a schematic illustration of the circuits involved in FIG. 1.

Referring to FIGS. 1 and 2, the accelerometer electro-mechanical subassembly 10 is composed of a pendulous proof mass 11 suspended at the pivot point 12 by a jewel pivot suspension 13. This suspension design is old and well known in the art.

Angular position of the pendulous proof mass 11 is measured by the pickoff coil 14. Hartley oscillator 15 senses the output of coil 14 and generates an analog output. This output is compared to a reference voltage 16 in peak detector 17. The output of the active filter compensation 18 is the integral of the position of the pendulous proof mass.

The active filter compensation 18 has an output which is compared with a triangle wave reference 19 in the pulse width modulator 20 to generate a PWM output. This output drives a synchronous clock (21) gated flip-flop 22 which drives the "H" switch 23 to gate the rebalance current through the torquer coil 24. Terminals A and B are all torquer connections. Coil 24 reacts with the pendulous proof mass 11 to hold the pendulum in a null position.

ANDing (25) the clock 21 with the output of the flip-flop 22 gives a digital output pulse count proportional to sensed acceleration. This output can be used for guidance, etc. Providing the accelerometer with a direct digital output has improved base instrument accuracy of better than a factor of 10 and has eliminated requirements for an external analog-to-digital converter and the converter's associated errors. This accuracy improvement was unexpected and is believed to be due to the fact that the accelerator pendulum dither results from the high frequency digital input to the torquer 24. This burnishes the jewel pivot bearing and breaks up the static frequency, resulting in unexpected accuracy improvement.

FIG. 2 is a detailed schematic illustration of the preferred mode, and shows one possible circuitry that can be used for the block diagrams shown in FIG. 1. The specific operation of this circuit shown in FIG. 2 is not necessary for a full understanding of the present invention; therefore such will not be included in this disclosure. The understanding of how such a circuit would operate would be obvious to one skilled in the art having this circuitry before him and knowing that it represents the block diagrams from FIG. 1.

I claim:

1. In an accelerometer having a pendulous mass mounted by a jewel pivot suspension with a pivot bearing, a pickoff coil, and a torque coil, the improvement comprising a Hartley oscillator having an input connected to said pickoff coil for sensing the current in the pickoff coil and producing an analog output signal proportional thereto at an output of said oscillator; a peak detector having an input connected to the output of said oscillator and having an output; a filter having an input connected to said output of said detector and having an output; a pulse width modulator connected to output of said filter for converting the analog signal into a pulse width modulated digital output; gating means connected to said pulse width modulator so as to produce a digital output proportional to changes sensed by the accelerometer; said gating means comprising a flip-flop having an input connected to an output of said pulse width modulator and having two outputs; an "H" switch having inputs connected to the outputs of said flip-flop and having an output; and said outputs of said "H" switch being connected to said torque coil for nulling said accelerometer and burnishing the pivot bearing.

* * * * *